US009213398B2

(12) United States Patent
Tong et al.

(10) Patent No.: US 9,213,398 B2
(45) Date of Patent: Dec. 15, 2015

(54) POINT OF SALE TERMINALS

(71) Applicant: HEWLETT-PACKARD DEVELOPMENT COMPANY, L.P., Houston, TX (US)

(72) Inventors: Szu Tao Tong, Taipei (TW); Hsin-Tso Lin, Taipei (TW); Cheng-Yi Yang, Taipei (TW); Chih Liang Li, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 13/847,080

(22) Filed: Mar. 19, 2013

(65) Prior Publication Data
US 2014/0289442 A1 Sep. 25, 2014

(51) Int. Cl.
*G06F 1/00* (2006.01)
*G06F 1/32* (2006.01)
*G06F 1/26* (2006.01)

(52) U.S. Cl.
CPC .............. *G06F 1/3243* (2013.01); *G06F 1/26* (2013.01); *G06F 1/3206* (2013.01)

(58) Field of Classification Search
CPC .................................... G06F 1/26; G06F 1/30
USPC ................................................. 713/300–340
See application file for complete search history.

(56) References Cited

U.S. PATENT DOCUMENTS

| 5,751,950 | A | 5/1998 | Crisan |
| 5,918,059 | A * | 6/1999 | Tavallaei et al. .............. 713/300 |
| 7,890,778 | B2 | 2/2011 | Jobs et al. |
| 8,255,712 | B2 | 8/2012 | Dang |
| 8,311,575 | B2 * | 11/2012 | Li et al. ...................... 455/550.1 |
| 2007/0091279 | A1 | 4/2007 | Chang et al. |
| 2008/0178280 | A1* | 7/2008 | Chen .............................. 726/16 |
| 2010/0318814 | A1* | 12/2010 | Chung et al. .................. 713/300 |
| 2012/0311310 | A1* | 12/2012 | Lin .................................. 713/1 |

FOREIGN PATENT DOCUMENTS

KR 20060008449 1/2006

OTHER PUBLICATIONS

Barnes & Noble. Nook User Guide Version 1.0.0.E. Barnes & Noble, Inc. New York, NY 10011.

* cited by examiner

*Primary Examiner* — Raymond Phan
(74) *Attorney, Agent, or Firm* — Hewlett-Packard Patent Department

(57) ABSTRACT

A keypad circuit provides a signal corresponding to an actuation of a button. A query is presented to confirm intent to place an apparatus in a low-power state in response to the signal. The apparatus assumes a low-power state in response to a confirmation. The apparatus is also configured to assume an active state from a low-power state in response to the signal. Point-of-sale terminals and other apparatus can be controlled and operated accordingly.

14 Claims, 5 Drawing Sheets

POINT OF SALE TERMINALS

BACKGROUND

Various apparatus, including point-of-sale terminals, operate by way of electronic circuitry. Such electronic circuitry consumes electrical energy during normal operations. The present teachings are directed to the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Systems and methods related to point-of-sale terminals and other apparatus are presented. A keypad circuit of an apparatus provides a signal corresponding to a user actuation of a button. A user is queried to confirm their intent to place the apparatus in a low-power state, in response to the signal. The apparatus assumes a low-power state in response to a confirmation of user intent. The apparatus is also configured to assume an active state from a low-power state in response to signaling triggered by the touch button.

In one example, an apparatus includes a chipset for performing respective operations associated with a processor, and a user-operable button. The apparatus also includes a keypad circuit to provide a button signal in response to an actuation of the user-operable button. The apparatus further includes a super input/output (SIO) to signal the chipset to assume an active state in response to the button signal when the apparatus is in a low-power state. The apparatus further includes a microcontroller to pass the button signal to the SIO in accordance with a user query when the apparatus is in an active state. The SIO is configured to signal the chipset to assume a low-power state in response to the button signal when the apparatus is in an active state.

In another example, a method includes receiving a power button signal while an apparatus is in an active state. The method also includes presenting a query in response to the power button signal while an apparatus is in an active state. The query is associated with an intent to shutdown the apparatus. The query is presented on a display screen of the apparatus by way of a microcontroller of the apparatus. The method also includes receiving an answer to the query. The method further includes causing the apparatus to assume a low-power state or remain in the active state in accordance with the answer to the query.

In yet another example, a point-of-sale terminal includes a power button, and a keypad circuit to provide a button signal in response to an actuation of the power button. The point-of-sale terminal also includes circuitry to cause the point-of-sale terminal to assume an active state from a low-power state in response to the button signal. The circuitry is configured to receive the button signal by way of a switch when the point-of-sale terminal is in a low-power state. The point-of-sale terminal further includes a microcontroller to pass the button signal to the circuitry in accordance with an answer to a query when the point-of-sale terminal is in an active state. The microcontroller is configured to present the query on a display of the point-of-sale terminal.

Illustrative System

Figure 1:
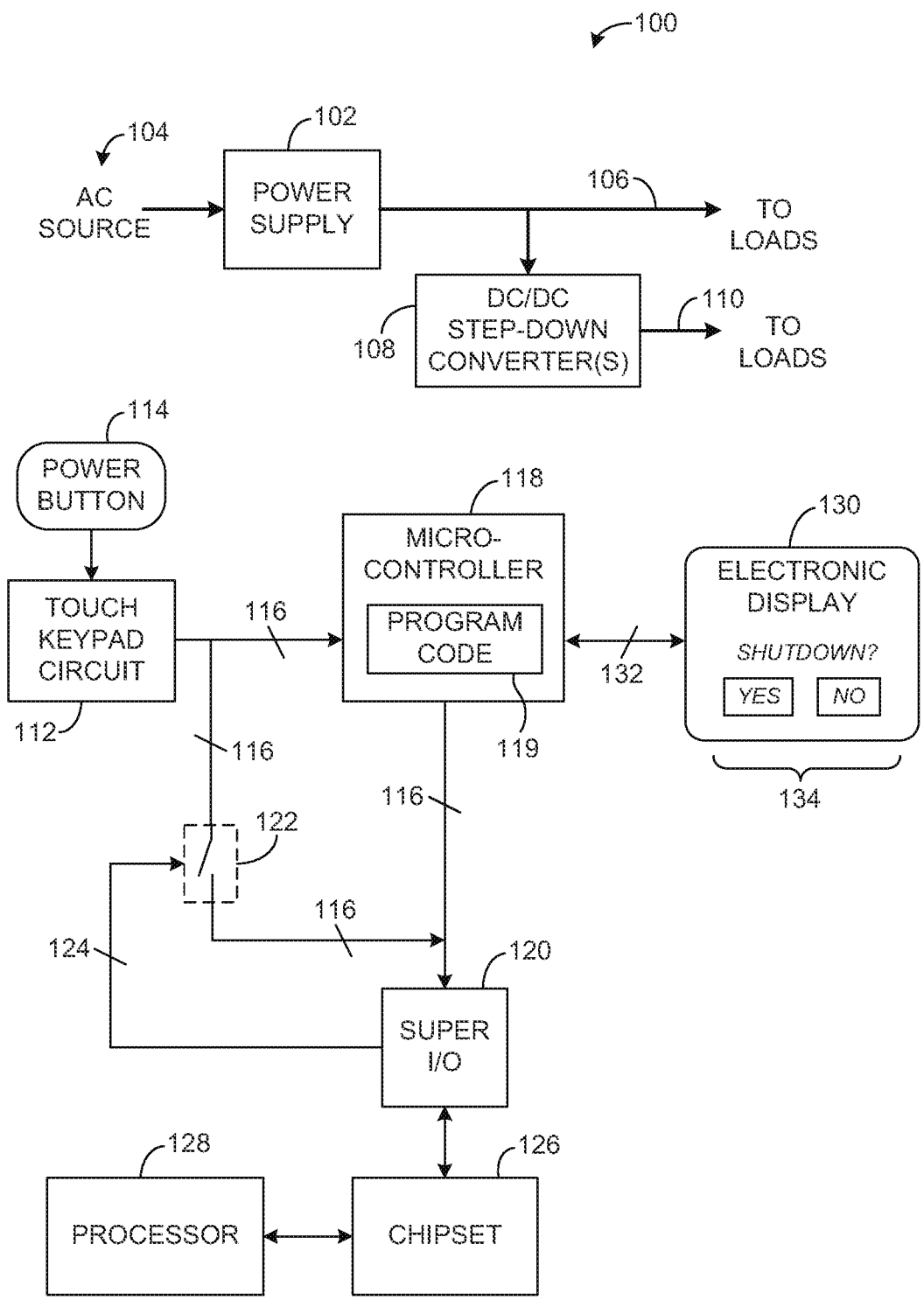
FIG. 1 depicts block diagram of an operation and control system according to one example of the present teachings.

Attention is directed now to FIG. 1, which depicts a block diagram of a system 100 in accordance with the present teachings. The system 100 is illustrative and non-limiting with respect to the present teachings. Other systems, devices, constituencies or configurations can also be used. The system 100 can also be referred to as an operation and control system (OCS) 100, or a portion thereof, in accordance with the present teachings. In one non-limiting example, the operation and control system 100 partially defines, or is included within, a point-of-sale terminal.

The system 100 includes a power supply (or main power supply) 102. The power supply 102 is configured to receive electrical energy (e.g., 120.0 VAC) from a source 104, such as a line-level utility, and provide a regulated output voltage (e.g., 19.0 VDC) at a node 106. The power supply 102 can be variously defined by or include, for non-limiting example, a switching-type supply, a linear-type supply, and so on. Other suitable power supplies 102 can also be used.

The system 100 also includes one or more direct current-to-direct current (DC-DC) step-down converters (converter) 108. Each converter 108 is configured to receive DC electrical energy from the node 106 and to provide a regulated output of relative lesser voltage (e.g., 5.0 VDC, 3.3 VDC, and so on). The illustrative converter 108 provides such regulated output voltage at a node 110. Electrical energy at the nodes 106 and 110 is coupled (provided) to various and respective loads (or entities), some of which are described below. Respective couplings to such loads are omitted in the interest of clarity.

The system 100 also includes a touch keypad circuit (keypad circuit) 112, coupled to a user-operable power button 114. The power button 114 can be defined by any suitable user-operable electrical switch. In one example, the power button 114 is defined by a capacitive-type flat touch switch. Other suitable power button 114 types can also be used. The keypad circuit 112 is configured to provide a button signal 116 in response to a user-actuation (touch, or momentary press) of the power button 114. The keypad circuit 112 receives operating electrical power from at least one of the converters (e.g., 108), and thus the keypad circuit 112 defines an electrical bad within the system 100. In one non-limiting example, the keypad circuit 112 is defined by a model SB358X, as available from ENE Technology Inc., Hsin-Chu City, Taiwan, ROC. Other suitable keypad circuits or integrated circuits can also be used.

The system 100 also includes a microcontroller (scalar microcontroller, or MCU) 118. The microcontroller 118 is configured to receive respective signals and to provide control signals in accordance with normal operations of an apparatus including the system 100. The microcontroller 118 is configured to receive the button signal 116 from the keypad circuit 112. In one non-limiting example, the microcontroller 118 is defined by (or includes) a model TSUMP58UHT5, as available from Mstar Semiconductor Inc., ChuPei Hsinchu Hsien, Taiwan, ROC. Other suitable microcontrollers can also be used.

The microcontroller 118 operates in accordance with a machine-readable program code 119 that is stored therein (or is otherwise accessible thereto). Such program code 119 is configured to cause the microcontroller 118 to perform various functions, including functions in accordance with the present teachings. The microcontroller 118 also operates (drives, or communicates with) an electronic display, which is described below.

The system 100 also includes a super I/O (SIO) 120. The SIO 120 is configured to interface (bridge, or buffer) signals and digital communications between various entities within or external to the system 100. The SIO 120 is configured to receive the button signal 116 by way of the microcontroller 118 or a switch 122. The SIO 120 provides a low-power state (LPS) signal 124. In one non-limiting example, the SIO 120 is defined by (or includes) a model NPCD379H, as available from Nuvoton Technology Corporation, Hsinchu Science Park, Taiwan, ROC. Other suitable SIOs can also be used.

As used herein, the term "super I/O" refers to a class of input/output controller integrated circuits that combine interfaces for a variety of devices. Non-limiting examples of devices to be interfaced by way of an SIO can include a magnetic disk controller, a parallel communications port, a serial communications port, a keyboard, a mouse, an infrared communication port, and so on. The term super I/O is not limiting or prejudicial with respect to the present teachings, and other suitable devices of analogous function can also be used.

The system 100 further includes the switch 122 introduced above. The switch 122 can be defined by a transistor, a relay, or another suitable controllable switching device. The switch 122 is configured to couple the button signal 116 to the SIO 120 in accordance with the LPS signal 124. Specifically, the switch 122 is "closed" so as to couple (i.e., route) the button signal 116 when the system 100 (or apparatus thereof) is in a low-power or "sleep" state. The switch 122 is "open" and does not couple (i.e., isolates) the button signal 116 when the system 100 (or associated apparatus) is in an active or "awake" state.

The system 100 also includes a chipset 126. The chipset 126 (also referred to as a Platform Control Hub, or PCH) is coupled to receive signaling from the SIO 120, including the button signal 116 or signaling corresponding thereto. The chipset 126 is configured to perform various functions associated with supporting operations of a processor 128. Such functions include, but are not limited to, signaling one or more of the converters 108, the microcontroller 118, the processor 128, and so on, to assume active or low-power states. In one non-limiting example, the chipset 126 is defined by (or includes) a BD82 (or 67) series chipset, as available from Intel Corporation, Santa Clara, Calif., USA. Other suitable chipsets can also be used.

The system 100 also includes the processor 128 introduced above. The processor 128 can be defined by a microprocessor, microcontroller or the like configured to perform various normal operations in accordance with a machine-readable program code. Such program code is configured to cause the processor 128 to function in accordance with the present teachings.

The processor 128 is configured to communicate signals and data with respective entities of the system 100 by way of the chipset 126. In one non-limiting example, the processor 128 is defined by a model LGA1155 Processor, as available from Intel Corporation, Santa Clara, Calif., USA. Other suitable processors can also be used.

The system further includes an electronic display (display) 130. The display 130 can be defined by any suitable display type, not limited to a liquid-crystal display (LCD), a thin-film transistor (TFT) display, and so on. The display 130 is configured to bidirectionally communicate data 132 with the microcontroller 118, and to present text, images, indicia, soft controls, or graphics accordingly.

As depicted, the display 130 presents a query 134 to a user requesting confirmation of an intent to shutdown the system 100 (or related apparatus). The display 130 can also communicate data 132 back to the microcontroller 118 corresponding to a user response to the query 134, such as user selection (contact or clicking) of a particular soft switch. Other types of information display and user feedback can also be performed by way of the display 130.

The various elements of the system 100, such as the microcontroller 118, the SIO 120, the chipset 126, the processor 128, and so on, are coupled to each other by way respective signal pathways not depicted. Thus, a "front-side" data bus, PCI bus, interrupt or other signal lines, and so on, as are familiar to one possessing ordinary skill, are omitted from FIG. 1 in the interest of clarity. Nonetheless, it is to be understood the various entities of the system 100 are coupled to communicate various electronic signals amongst each other as needed to support normal, typical operations and to function in accordance with the present teachings.

Illustrative Method

Figure 2A:
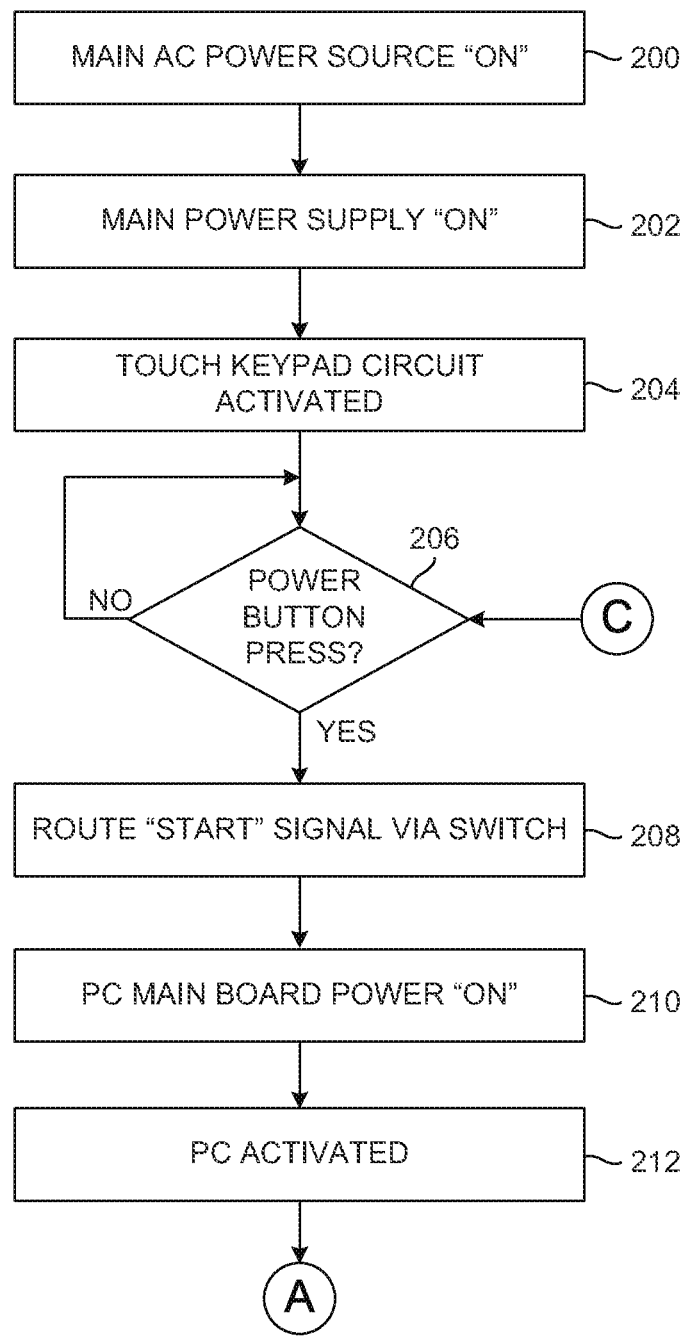
FIGS. 2A, 2B and 2C collectively depict a flow diagram of a method according to another example of the present teachings.
Figure 2B:
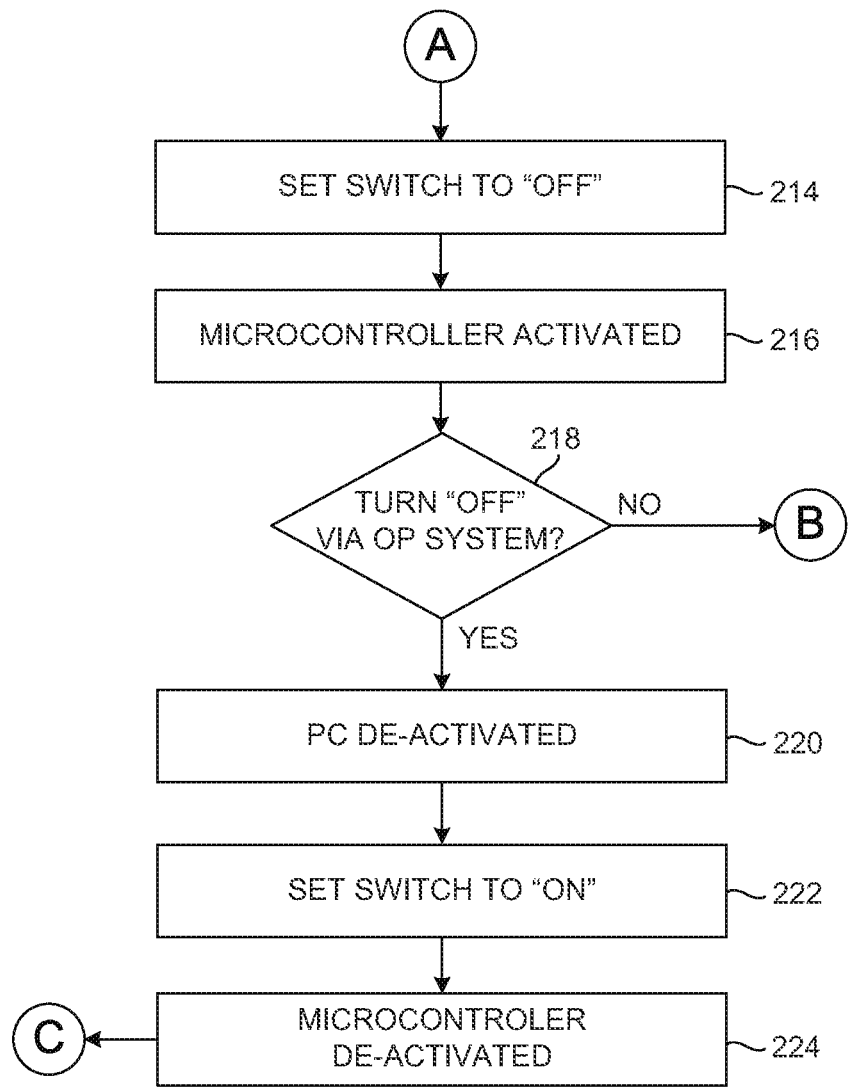
Figure 2C:
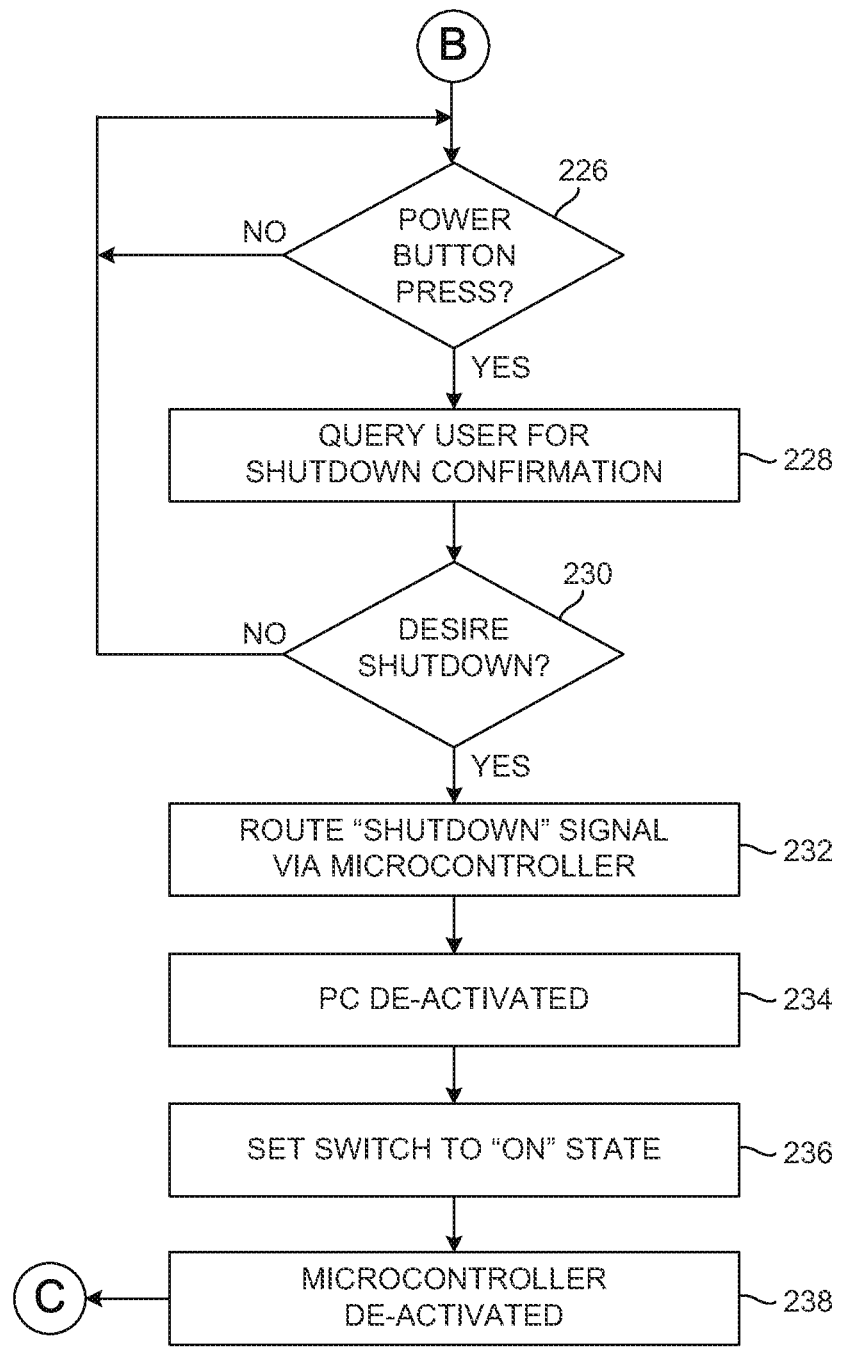

Reference is made now to FIGS. 2A, 2B and 2C, which collectively depict a flow diagram of a method according to the present teachings. The method of FIGS. 2A-2C includes particular steps performed in a particular order of execution. However, other methods including other steps, omitting one or more of the depicted steps, or proceeding in other orders of execution can also be defined and used. Thus, the method of FIGS. 2A-2C is illustrative and non-limiting with respect to the present teachings. Reference is also made to FIG. 1 in the interest of illustrating the method of FIGS. 2A-2C.

At 200, a main source of power is turned "ON". For purposes of a present example, an apparatus including the system 100 is connected to a source 104 of line-level electrical energy. One-hundred twenty volts of AC electrical power are now coupled to the system 100.

At 202, a main power supply is "ON". In the present example, the power supply 102 is energized and operational, and provides a regulated nineteen volts DC at the node 106. At least one of the DC-DC converters 108 is now energized such that electrical energy can be provided to at least the keypad circuit 112.

At 204, a touch keypad circuit is activated. For purposes of the present example, the keypad circuit 112 receives electrical energy from one or more of the converters 108 and assumes an active operating mode. The keypad circuit 112 is now ready to sense or detect a user-actuation of the power button 114, and to provide (or assert) the button signal 116 accordingly. However, other aspects of the system 100 are presently in a low-power state ("sleep" condition) in the interest of energy conservation.

At 206, it is determined if a user has pressed the power button. For purposes of the present example, the keypad circuit 112 monitors the power button 114. If a user presses (touches) the power button 114, then the method proceeds to step 208 below. Otherwise, the method dwells at step 206 awaiting a user actuation of the power button 114.

At 208, a start signal is routed via a switch. For purposes of the present example, the keypad circuit 112 asserts the button signal 116, which is routed to the SIO 120 by way of the switch 112. The present instance of the button signal 116 is referred to as a "start" signal because it functions to signal or trigger the remainder of the system 100 into an active state.

At 210, a PC main board power is turned "ON". For purposes of the present example, the SIO 120 responds to the button signal ("start") 116 and signals the chipset 126 to an active state. In turn, the chipset 126 signals all of the sleeping DC-DC converters 108 into an active mode, and signals the processor 128 into an active state as well.

At 212, the PC is activated. In the present example, the processor 128 responds to the chipset 126 signaling and assumes an active mode, and begins to perform normal operations in accordance with a program code. The method proceeds on to step 214, is indicated by connector "A". In one non-limiting example, the processor 128 performs operations in accordance with a Microsoft Windows™ operating system (OS) or an associated application.

At 214, the switch is set to "OFF". In the present example, the SIO 120 changes or asserts (or un-asserts) the LPS signal 124 such that the switch 122 assumes an "open" condition. Under the present condition, the touch button signal 116 is no longer directly coupled to the SIO 120.

At 216, the microcontroller is activated. In the present example, the chipset 126 signals the microcontroller 118 to assume an active state. The microcontroller 118 begins to perform normal, typical operations in accordance with the machine-readable program code 119. The system 100 is now considered fully operational (awake), and typical, normal functions of a point-of-sale terminal or other corresponding user apparatus can be performed.

At 218, it is determined if the system 100 is being shutdown under operating system control. For purposes of the present example, processor 128 determines if operating system is calling for system 100 to shutdown. Such a shut down might be triggered, for example, by user selection of a corresponding soft control on the display 130. If yes, then the method proceeds to step 220 below. If no, then the method proceeds to step 226 as indicated by connector "B".

At 220, the PC is deactivated. For purposes of the present example, the processor 128 provides signaling to the chipset 126 so to cause the system 100 to transition into a low-power state (or sleep). The processor 128 also performs various functions to prepare for and then assume a low-power state.

At 222, the switch is set to "ON". In the present example, the SIO 120 asserts the LPS signal 124 in accordance with the low-power state being assumed by the system 100. In response, the switch 122 assumes a "closed" condition. The button signal 116—that is, any future assertion thereof—is now directly coupled to the SIO 120.

At 224, the microcontroller is deactivated. For purposes of the present example, the microcontroller 118 assumes a low-power state as signaled by the chipset 126. The microcontroller 118 cannot respond to an assertion of the button signal 116 in the present, low-power state. The method then returns to step 206 above as indicated by connector "C".

At 226, it is determined if a user has pressed the power button. For purposes of the present example, the keypad circuit 112 monitors the power button 114. If a user presses (touches) the power button 114, then the method proceeds to step 228 below. Otherwise, the method dwells at step 226 awaiting user actuation of the power button 114. The system 100 is in an active state, able to perform various normal operations.

At 228, a user is queried for a shutdown confirmation. In the present example, the microcontroller 118 is signaled in response to the button press at 226 above. The microcontroller 118 responds by querying a user by way of the display 130. Such a query 134 asks the user to confirm their intent to send the system 100 into a shutdown mode (sleep state). Confirmation is requested in order to avoid departure from the active mode in response to an unintended actuation (accidental touch) of the power button 114.

At 230, it is determined if the user intends to shutdown the system. In the present example, if the query at step 228 is answered in the affirmative (shutdown intended), then the method proceeds to step 232 below. If the query at step 228 is answered in the negative (shutdown not intended), then the method proceeds back to step 226 above, and the active mode is maintained.

At 232, a shutdown signal is routed via the microcontroller. For purposes of the present example, the microcontroller 118 passes the button signal 116 to the SIO 120. The SIO 120 interprets the present instance of the button signal 116 as a "shutdown" signal, and communicates it (or a corresponding signal) to the chipset 126.

At 234, the PC is deactivated. For purposes of the present example, the chipset 126 signals the processor 128 causing it to prepare for and assume a low-power state. Similar signaling is also sent to other entities of the system 100, such as (without limitation) the microcontroller 118 and one or more of the converters 108.

At 236, the switch is set to "ON". In the present example, the SIO 120 asserts the LPS signal 124 in accordance with the low-power state being assumed by the system 100. In response, the switch 122 assumes a "closed" condition. Any future assertion of the button signal 116 is now directly coupled to the SIO 120.

At 238, the microcontroller is deactivated. For purposes of the present example, the microcontroller 118 assumes a low-power state as signaled by the chipset 126. The microcontroller 118 cannot respond to an assertion of the button signal 116 in the present, low-power state. The method then returns to step 206 above as indicated by connector "C".

Illustrative Point-of-Sale Terminal

Figure 3:
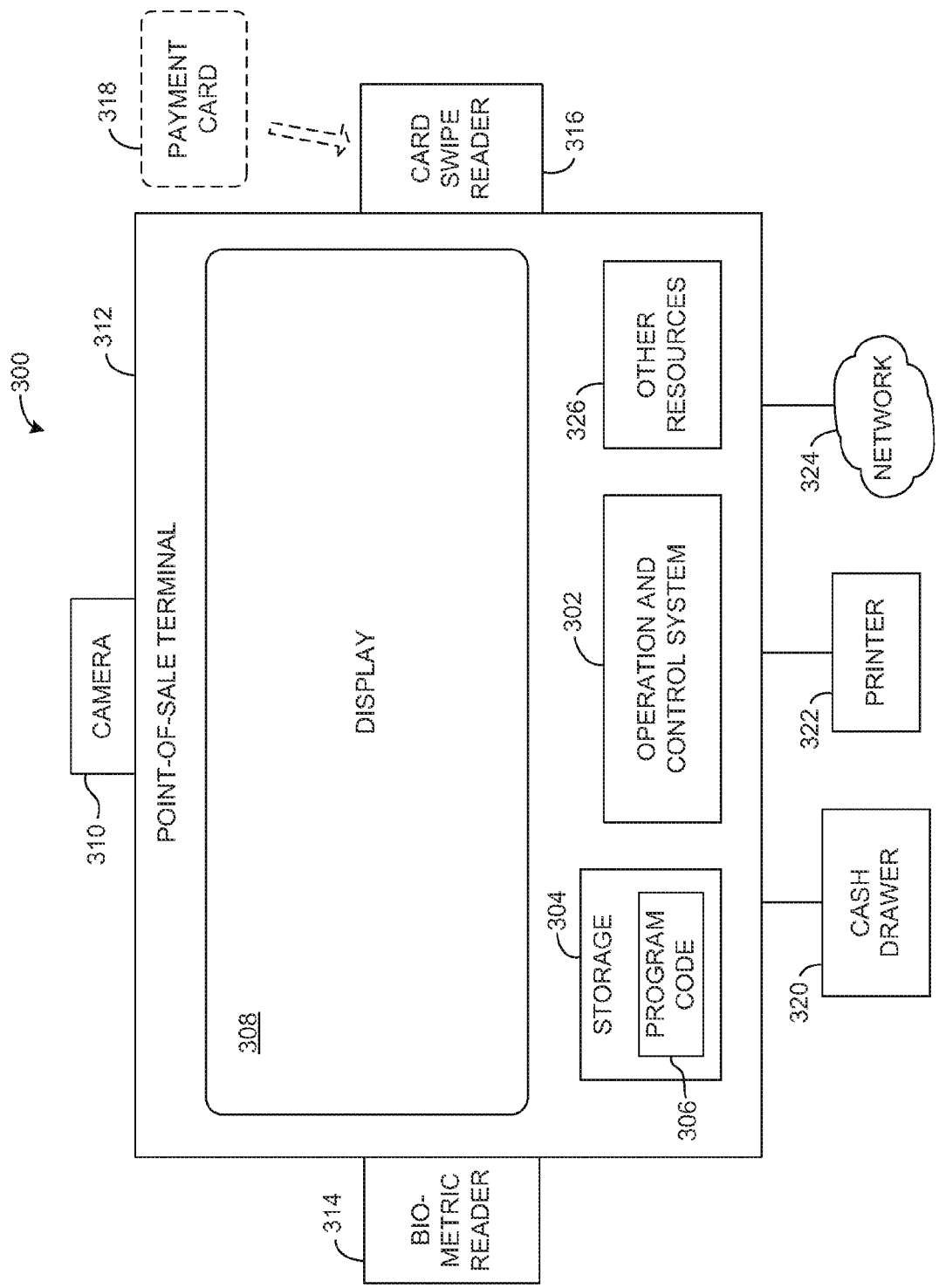
FIG. 3 depicts a block diagram of a point-of-sale terminal according to another example of the present teachings.

Attention is now turned to FIG. 3, which depicts a block diagram of a point-of-sale terminal (terminal) 300 in accordance with the present teachings. The terminal 300 is illustrative and non-limiting with respect to the present teachings. Other terminals, systems, devices, constituencies or configurations can also be used.

The terminal 300 includes an operation and control system (OCS) 302. The OCS 302 is equivalent or analogous to the system 100 described above, and is configured to perform various functions in accordance with the present teachings. Thus, the OCS 302 includes a power button (touch switch) (e.g., 114) that is used to trigger startup (active mode) or shutdown (sleep mode) operations of the terminal 300. The OCS 302 includes respective entities that are couple to communicate date or signals with other aspects of the terminal 100.

The terminal 300 also includes storage media 304 including a program code 306. The storage media 304 can be defined by any tangible, machine-readable storage media such as, without limitation, non-volatile memory, a magnetic storage media, an optical storage media, read-only memory (ROM), and so on. Other suitable storage media 304 can also be used.

The program code 306 is configured to cause a processor (e.g., 128) of the OCS 302 to perform normal, typical operations in accordance with usage of the terminal 300. The program code 306 is also configured to cause the processor of the OCS 302 to function in accordance with the present teachings including, without limitation, as described in the method above. The program code 306 can be at least partially defined by an operating system, one or more applications, and so on.

The terminal 300 also includes a display 308. The display 308 is coupled to communicate with the OCS 302 and to display indicia, text, graphical images and so on accordingly. The display 308 is also configured to display soft controls or soft switches, and communicate data corresponding to a user actuation thereof, to the OCS 302.

The terminal 300 also includes a camera 310 supported by (or on) a housing 312. The camera 310 is configured to provide imaging signals to the OCS 302 corresponding to persons or objects within its field of view. For example, digital photographs of customers or sales personnel can be taken and stored for transaction verification, identification, security or other purposes.

The terminal 300 further includes a biometric reader 314 supported on the housing 312. The biometric reader 314 is configured to scan a fingerprint, thumbprint, or other unique bio-characteristic of a user and to provide corresponding data to the OCS 302. The biometric reader 314 is therefore used in identify verification, secured access to the terminal 300, or other suitable functions.

The terminal 300 also includes a card swipe reader (reader) 316. The reader 316 is configured to read magnetically-encoded data on a customer payment card 318 (i.e., credit or debit card) and to provide corresponding data to the OCS 302. Thus, the reader 316 is used to perform credit- or debit-based purchases by way of the terminal 300.

The terminal 300 is connected to (or include) a cash drawer 320. Access to (opening) the cash drawer 320 is controlled by signaling from the OCS 302, and the cash drawer 320 is configured to securely store paper currency, coinage, negotiable paper (checks), and so on. The terminal 300 is also connected to (or includes) a printer 322. The printer 322 can provide hardcopy (printed) documents such as transaction receipts, product warranty information, and so on. The printer 322 is coupled to communicate with the OCS 302.

The terminal 300 is also connected to communicate with a network 324. The network 324 can be defined by or include access to a local-area network (LAN), a wide-area network (WAN), the Internet, and so on. The terminal 300 can communicate information related to point-of-sale transactions to a server or other remote entity by way of the network 324.

The terminal 300 further includes other resources 326. Such other resources 326 can include any suitable constituency or configuration required for normal operations of the terminal 300. Non-limiting examples include, but are not limited to, wireless communications circuitry, audio circuitry, a barcode scanning device, and so on. Other resources 326 can also be included or used.

The terminal 300 operated to perform numerous tasks associated with point-of-sale transactions between a customer entity and a business entity. Furthermore, the terminal 300 includes features and functions in accordance with the present teachings such that a power button (e.g., 114) can be used to initiate an active mode of operations, or to initiate a sleep mode (low-power state).

In general, the present teachings contemplate electronic circuits, apparatus and methods for controlling a point-of-sale terminal (POST) or other user apparatus. Electronic circuitry, defining at least in part an operation and control system, includes a power button or "touch switch" that is coupled to a corresponding keypad circuit or integrated circuit device. Button signaling corresponding to a user actuation of the power button is provided by the keypad circuit to respective entities of the OCS.

During return to an active mode, the OCS responds to the button signaling by powering and activating respective entities so that normal, typical functions of the POST can be performed. If the button signaling is issued during active mode, the OCS queries a user via a display to confirm their intent to shutdown the POST. If the user verifies intent to shutdown, via the display, the OCS causes the POST to assume a low-power or "sleep" state. If the user denies intent to shutdown, the OCS ignores the present instance of the button signaling, and active mode operations are continued. Such user response to the query can be performed using a soft switch or soft control presented on the display, and not by way of the power button. Unintended departure from active mode operations, and the associated inconvenience and wasted time, are thus avoided.

In general, the foregoing description is intended to be illustrative and not restrictive. Many embodiments and applications other than the examples provided would be apparent to those of skill in the art upon reading the above description. The scope of the present disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the present disclosure is capable of modification and variation and is limited only by the following claims.

What is claimed is:

1. An apparatus, comprising:
a chipset to perform respective operations associated with a processor;
a user-operable button;
a keypad circuit to provide a button signal in response to an actuation of the user-operable button;
a super input/output (SIO) to signal the chipset to assume an active state in response to the button signal when the apparatus is in a low-power state;
a microcontroller to pass the button signal to the SIO in accordance with a user query when the apparatus is in an active state, the SIO to signal the chipset to assume a low-power state in response to the button signal when the apparatus is in an active state;
a housing; and
a card swipe reader supported by the housing, the card swipe reader to provide data signaling to the chipset corresponding to a point-of-sale transaction.

2. The apparatus according to claim 1 further comprising:
a display;
a storage media including a machine-readable program code, the program code to cause the microcontroller to present a query to confirm a desire to shutdown the apparatus by way of the display in response to the button signal when the apparatus is in an active state, the program code to cause the microcontroller to pass the button signal if the query is answered in the affirmative, the program code to cause the microcontroller to not pass the button signal if the query is answered in the negative.

3. The apparatus according to claim 1 further comprising a switch to couple the keypad circuit to the SIO, the switch controlled by a low-power state signal provided by the SIO, the switch dosed such that the SIO receives the button signal directly from the keypad circuit when the apparatus is in a low-power state, the switch open such that the SIO does not receive the button signal directly from the keypad circuit when the apparatus is in an active state.

4. The apparatus according to claim 1 further comprising a housing, the user-operable button supported by the housing, the user-operable button comprising a capacitive-type touch button.

5. The apparatus according to claim 1 further comprising:
a power supply to provide a main direct-current (DC) voltage;

plural DC-DC converters each to provide a respective regulated voltage derived from the main DC voltage, at least one of the DC-DC converters to provide operating power to the keypad circuit when the apparatus is in a sleep state.

6. The apparatus according to claim 1, the microcontroller to consume less electrical energy when the apparatus is in a low-power state then when the apparatus is in active state, the SIO in an active state when the apparatus is in a low-power state.

7. The apparatus according to claim 1, the apparatus to consume less than 0.11 watts of electrical energy when in a low-power state.

8. The apparatus according to claim 1 further comprising a cash drawer coupled to and controlled by the apparatus.

9. The apparatus according to claim 5, at least one of the DC-DC converters to assume an inactive mode when the apparatus is in a low-power state.

10. A method comprising:
receiving a power button signal while an apparatus is in an active state;
presenting a query in response to the power button signal while an apparatus is in an active state, the query associated with an intent to shutdown the apparatus, the query presented on a display screen of the apparatus by way of a microcontroller of the apparatus;
receiving an answer to the query;
causing the apparatus to assume a low-power state or remain in the active state in accordance with the answer to the query; and
swiping a payment card using a card swipe reader of the apparatus while the apparatus is in the active state, the swiping performed as a part of a point-of-sale transaction.

11. The method according to claim 10 further comprising:
receiving a power button signal while the apparatus is in the low-power state, he power button signal received by a super input output (SIO) of the apparatus by way of a switch of the apparatus; and
causing the apparatus to assume the active state.

12. The method according to claim 10 further comprising:
causing a first DC-DC converter of the apparatus to assume an inactive state while the apparatus is in the low-power state; and
causing a second DC-DC converter of the apparatus to remain in the active state while the apparatus is in the low-power state.

13. The method according to claim 10, the apparatus consuming electrical energy at a rate of less than 0.11 watts while in the low-power state.

14. A point-of-sale terminal, comprising:
a power button;
a keypad circuit to provide a button signal in response to an actuation of the power button;
circuitry to cause the point-of-sale terminal to assume an active state from a low-power state in response to the button signal, the circuitry to receive the button signal by way of a switch when the point-of-sale terminal is in a low-power state; and
a microcontroller to pass the button signal to the circuitry in accordance with an answer to a query when the point-of-sale terminal is in an active state, the microcontroller to present the query on a display of the point-of-sale terminal, wherein the circuitry is to cause the point-of-sale terminal to assume a low-power state from an active state in response to the button signal passed by way of the microcontroller.

\* \* \* \* \*

UNITED STATES PATENT AND TRADEMARK OFFICE
CERTIFICATE OF CORRECTION

PATENT NO. : 9,213,398 B2  
APPLICATION NO. : 13/847080  
DATED : December 15, 2015  
INVENTOR(S) : Szu Tao Tong et al.

Page 1 of 1

It is certified that error appears in the above-identified patent and that said Letters Patent is hereby corrected as shown below:

Claims

In column 8, line 56, in Claim 3, delete "dosed" and insert -- closed --, therefor.

In column 10, line 3, in Claim 11, delete "he" and insert -- the --, therefor.

In column 10, line 4, in Claim 11, delete "input output" and insert -- input/output --, therefor.

Signed and Sealed this
Twenty-sixth Day of July, 2016

Michelle K. Lee
*Director of the United States Patent and Trademark Office*